Oct. 29, 1968  J. P. SANSABRINO  3,407,903
SELF-LUBRICATED CONNECTOR
Filed Sept. 28, 1965
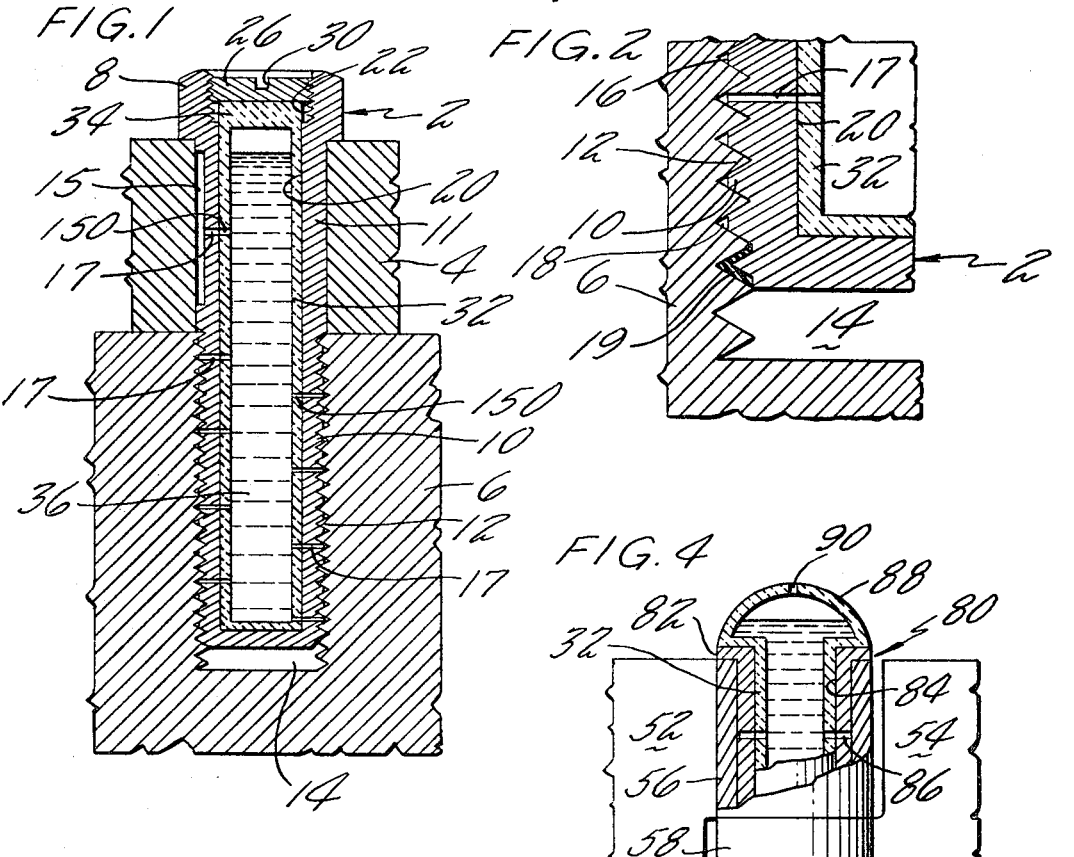
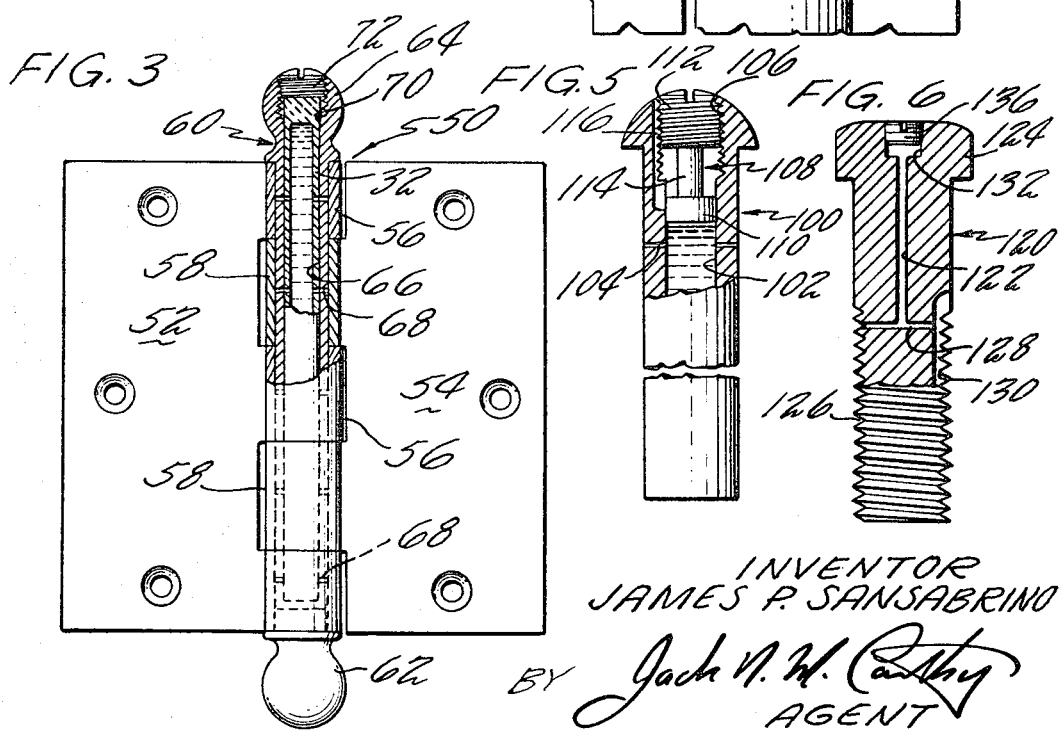
INVENTOR
JAMES P. SANSABRINO
BY Jack N. W. Carthy
AGENT

United States Patent Office 3,407,903
Patented Oct. 29, 1968

3,407,903
SELF-LUBRICATED CONNECTOR
James P. Sansabrino, 2 Arthur Drive,
Bloomfield, Conn. 06002
Filed Sept. 28, 1965, Ser. No. 490,876
11 Claims. (Cl. 184—14)

ABSTRACT OF THE DISCLOSURE

A holding device having a head and longitudinal extension for holding two members together, said holding device having a bore extending into the longitudinal extension with lubricant means in said bore adapted to release a lubricant. Said lubricant means comprising a container with a lubricant therein. Said longitudinal extension having passages between the bore and the exterior thereof for permitting a flow of lubricant therethrough. The container being adapted to be punctured in position to release its lubricant and means in said device for applying a pressure to said lubricant. When said holding device has threads, the peak of the threads can be flattened for a portion to permit a passageway between the flat portion and the member receiving the holding device.

---

This invention relates to a self-lubricating pin, bolt, screw or other like element.

An object of this invention is to provide a pin, bolt or screw with a self-contained lubricating reservoir.

Another object of this invention is to provide a pin, bolt or screw with means for pressurizing a self-contained reservoir having a lubricant to force the lubricant to the exterior surface thereof.

A further object of this invention is to provide a pin, bolt or screw with a bore or chamber which will receive a predetermined amount of lubricant in a fitting plastic or resilient-type container.

Another object of this invention is to provide a pin, bolt or screw with radially extending holes so that a pointed lubricating releasing tool can be extended into said holes to pierce the container of lubricant, said holes then permitting the lubricant to pass from the interior of the pin, bolt or screw to the exterior thereof.

Another object of the invention is to provide a bolt or screw with a bore longitudinally therein having redially extending holes to the helical peak of the threads, which is flattened to a point adjacent the bottom.

A further object of this invention is to provide a pin, bolt or screw with a bore extending through the top thereof, having a container of plastic or other type of resilient or crushable material which includes a top which forms the head thereof and also permits a force to be applied thereto to be a pressure on the lubricant.

Another object of this invention is to provide a hinge having a pin with a self-contained lubricant which can be easily forced into the relatively moving surfaces of the hinge.

Other objects and advantages will be obvious from a reading of the attached specification and claims in conjunction with the drawings.

FIG. 1 is a sectional view taken through a bolt containing the invention, said bolt fixing two plates together.

FIG. 2 is an enlarged section showing the lower part of a bolt with a seal.

FIG. 3 is a view of a hinge with the hinge pin partially in section containing the invention.

FIG. 4 is an enlarged view showing the top of a hinge pin being deformable for pressurizing the self-contained lubricant.

FIG. 5 is a modification of a pin with a movable piston-type member for applying a pressure to the self-contained lubricant in the pin.

FIG. 6 is another modification of a bolt containing the invention with a radially extending hole meeting longitudinal slots extending along the face of the threaded section.

FIG. 1 shows a bolt 2 positioned so as to fix a plate 4 to a base plate 6. The head 8 of the bolt 2 has its lower surface resting as a flange on top of the plate 4. The threaded end 10 of the bolt 2 threadably engages the cooperating threaded side 12 formed in the bore 14 of the base plate 6. The spiral thread of the threaded end 10 of the bolt 2 has its peak flattened to form a helical surface 16 (see FIG. 2), said surface forming a helical passage with the inner mating part 18 of the threaded side 12 of the bore of base plate 6. The flattened portion of the threads extends to a point adjacent to the end of the bolt with the bottom-most portion remaining, forming a seal so that the lubricant does not run into the bore. The upper stem 11 of the bolt is shown having longitudinal grooves 15 around the outer surface. A seal 19 can be used for a more positive sealing action. This seal 19 can be an insert of a sealing material forming a length of the thread and extending into the inner part 18 of the threads 12 of the bore 14.

The bolt 2 has a longitudinal bore 20 extending therein through said head to a point adjacent the bottom thereof. Radial passages 17 extend from the grooves 15 to the bore 20 and from the flat helical surface 16 to the bore 20. A threaded section 22 is formed in the head 8. This section is threaded to receive an actuating disc 26 which has an outer threaded portion cooperating therewith. A slot 30 is provided in the top thereof to move the disc along the length of the section 22.

An easily piercable container 32 fits snugly into the longitudinal bore 20 and has a solid top 34 which is formed as a piston. The container can be made out of a resilient material which will permit the solid portion 34 to move downwardly into the bore 20 for a purpose to be hereinafter described. A crushable material could also be used which would crumple under force applied to the solid top 34 by disc 26. The solid top 34 extends into the threaded bore section 22 of the head 8 and engages the bottom of the disc 26. The container 32 is filled with a lubricant 36 to a predetermined height.

Container 32 could be made of a porous flexible material which would prevent lubricant flow therethrough below a predetermined pressure but would permit flow therethrough under an applied elevated pressure greater than said predetermined pressure.

As viewed in FIG. 3, a hinge 50 is made up having two hinge plates 52 and 54. Hinge plate 52 has three hinge straps 56, while hinge plate 54 has two hinge straps 68 which fit within the two openings between the three straps 56. In position, these straps form an axial passageway to receive a hinge pin 60 from one end and a decorative end stop 62 at the other end which matches the shape of the top 64 of the hinge pin 60. The end stop 62 also forms a bottom to the axial passageway formed by the straps.

The hinge pin 60 is formed in a similar manner to the bolt 2 of FIG. 1. The hinge pin has a longitudinal bore 66 extending therein through said head to a point adjacent the bottom thereof. Radial passages 68 extend from the interior of the bore 66 to the outer surface of the pin at spaced points along the length of the pin. As shown in FIG. 3, groups of these passages appear at approximately the midpoints of the lengths of each of the straps. A threaded section 70 is formed in the head 64. This section is threaded to receive an actuating disc 72 which has an outer threaded portion cooperating therewith. A slot is provided in the top thereof to move the disc along the length of the section 70. The container 32 is identical to the one described above.

FIG. 4 is a hinge pin modification showing a hinge pin 80 having merely a flat head 82. This hinge pin is similar to the one in FIG. 3 in that it has a longitudinal bore 84 extending therein through said flat head to a point adjacent the bottom thereof. Radial passages 86 extend in the same manner as before. The easily piercable container 32 fits snugly into the longitudinal bore 84 and has a top 88, which is formed bulbous with its bottom part extending to the outer diameter of the flat head 82 and setting flat thereagainst. A small hole 90 appears in the uppermost point of the bulbous portion. This hole can be used not only to fill the container with a lubricant, but to allow air to enter the container after it has once been pushed downward to its lower limit. To force the lubricant down into said hinge pin, an operator would press his thumb over the hole, deforming the top 88, thereby applying pressure to the lubricant.

FIG. 5 is another modification of a hinge pin 100 with a longitudinal bore 102 extending therein through said head to a point adjacent the bottom thereof and with radial passages 104 extending through the walls thereof from the interior of the bore 102 to the outer surface of the pin. A threaded section 106 is formed in the head and this section receives an actuating device 108 having a piston member 110 interconnected with a threaded portion 112 by a stem 114. A slot 116 extends downwardly into said longitudinal bore 102 to a point midway on the side of the piston member 110 when the device 108 is in the upper position shown in FIG. 5. A turning slot is provided in the top of the portion 112 as in other modifications. For filling and relocating the actuating position of the device 108, the device is moved upwardly until the bottom of the piston member 110 is above the bottom of the slot 116.

FIG. 6 is a modification of a bolt 120 containing a small longitudinal bore 122 extending through the head 124 to a point adjacent the top of the threaded portion 126. A radial passageway 128 extends from the bottom of the small bore 122 and engages a longitudinal groove 130 which extends along the length of the threaded portion 126. While only one groove 130 is shown, many can be used. The head 124 has an enlarged internally threaded bore 132 located coaxially with the bore 122. This bore contains an actuating disc 136 for applying pressure on a lubricant placed within the bolt and which extends into the bore 132. Disc 134 also has an actuating slot on its top.

Further, a stick of lubricant which is solid at room temperature and liquid at an elevated temperature could be used in place of the container 32. In FIG. 1, for example, the stick of lubricant could be slid all the way into the bore 20, projecting upwardly to the bottom of the actuating disc 26 as the container 32 as shown. The lubricant would be heated by a lubricant heating means when it is desired that the lubricant should flow. A separate device to heat the lubricant could be used such as a heating element placed in the plates being connected, in the bolt or pin, or in the stick of lubricant. Leads from the element would extend externally of the bolt or pin if the element was located therein or in the lubricant. If an element were placed in the base plate 6, for example, the leads therefrom would extend to a point accessible to an operator. The free ends of the leads would be connected to an electrical source actually heating the element. Of course in some cases, the plates receiving the bolt or pin are located in an area of an engine or other device which normally operates at an elevated temperature so the heat is automatically supplied as the engine or device is running. If accessible, the area around the bolt or pin could be heated by external means such as a blow torch.

Operation

In FIG. 1, the bolt 2, before use, would appear as it does there without the passages 150 in the easily pierceable container 32. In the use of the bolt 2 to hold a plate 4 to a base plate 6, the hole in the plate 4 would be located over the bore 14 having a threaded side 12, a pointed pin would then be inserted into each radial passage 17 and pierce the container 32 making the holes 150. The bolt would then be passed through the hole in plate 4 with the threaded end 10 of the bolt 2 threadably engaging the cooperating threaded side 12 formed in the bore 14 of the base plate 6 and tightened. It can be seen that the lubricant within the container 32 will tend to flow through the pierced passages or holes 150 and then through the passages 17 to the grooves 15 and the helical passage formed between the helical surface 16 and the inner mating part 18 of the threaded side 12 of the bore 14. It can be seen that the lubricant in the helical passage will pass down until it reaches the sealed end at the bottom of the bolt. If it is desired to apply a pressure to the lubricant in the container 32, the actuating disc 26 is rotated by the use of a screwdriver extending into slot 30, and this action presses down on the solid top 34 of the container 32 and forces the lubricant out of the passages or holes 150 and then through passages 17 to the exterior surface of the bolt. If the actuating disc 26 has been screwed down to its lower extremity so as not to act on the top 34 any more, the actuating disc 26 can be removed and a spacer inserted against the top 34, which is the same size or a little smaller, the actuating disc can then be replaced and screwed down to abut the spacer. It can be seen that the actuating disc 26 can now move the solid top 34 further into the bore 20 a distance equal to the thickness of the spacer. Instead of a spacer, another actuating disc can be used which would have a downwardly extending piston member fixed thereto, dimensioned to fit within the bore 20. Here again, it can be seen that this new actuating disc will be able to force the solid top 34 further down into the bore 20 the length of the downwardly extending piston member.

The hinge pin as shown in FIG. 3 is of a similar construction and operation. As a "squeak" is noted, a turn can be given to actuating disc 72 to force the lubricant into the relatively moving surfaces of the hinge.

In the top of the pin 100 of FIG. 5, an actuating device 108 shows a threaded portion 112 connected directly to a piston member 110. In this modification, when the actuating device reaches its lower limit, it can be raised until the bottom of the piston member 110 comes above the bottom of the slot 116. In this position the exterior of the pin is connected to the interior of longitudinal bore 102. An easily piercable container could also be used to hold the lubricant within the bore.

A bolt or pin, such as shown in FIGS. 1 and 3, could be used without the piercable container 32. In this usage, the bolt or pin would be installed as usual without a lubricant, and when a lubricant was desired around the outer surface of the bolt or pin at an inaccessible place, a lubricant could be placed within the bore 20, or bore 66, by removing the actuating disc 26, or 72, respectively. For applying pressure, these actuating discs could be replaced and screwed downwardly into the head, thereby forcing the lubricant out of the passages 17, or 68, respectively.

While the embodiments of the invention as herein disclosed constitute preferred forms, it is to be understood that other forms might be adopted without departing from the scope of the invention.

I claim:

1. A holding device having a head and longitudinal extension for holding two members together, said head and longitudinal extension having a bore extending into said longitudinal extension, lubricant means in said bore adapted to release a lubricant, said lubricant means comprising a container with a lubricant therein, passages in said longitudinal extension between the bore and exterior thereof for permitting a flow of lubricant therethrough, said container being adapted to be punctured in position through said passages to release its lubricant, means for applying a pressure to said lubricant to force it through said passages.

2. A holding device a set forth in claim 1 wherein said last-named means comprises an actuating member, said actuating member being externally threaded, said externally threaded actuating member threadably engaging said internally threaded open end of said bore, means for rotating said actuating member in said bore.

3. A holding device as set forth in claim 1 wherein a portion of said longitudinal extension is threaded and a length of the threaded portion is flat on the top thereof, at least one of said passages in said longitudinal extension extending between the bore and the flat part of the threads.

4. A holding device having a head and longitudinal extension with a free end for holding two members together, said longitudinal extension being externally threaded for a distance along its longitudinal extension to the free end, said externally threaded portion having a flat portion along the peak of the thread, said head and longitudinal extension having a bore extending into said longitudinal extension, means containing a lubricant in said bore, passages in said longitudinal extension between the bore and exterior thereof where it is externally threaded for directing a flow of lubricant therethrough to the flat portion of the threaded area, means for releasing said lubricant in said bore, means for applying a pressure to said lubricant to force it through said passages.

5. A holding device having a head and longitudinal extension for holding two members together, said head and longitudinal extension having a bore extending into said longitudinal extension, lubricant containing means in said bore including a lubricant, said lubricant containing means having a solid top at one end, passages in said longitudinal extension between the bore and exterior thereof for permitting a flow of lubricant therethrough, means in said device for applying a pressure to said lubricant to force it through said passages, said open end of said bore being internally threaded, said last-named means comprising an actuating member, said actuating member being externally threaded, said externally threaded actuating member threadably engaging said internally threaded open end of said bore, means for rotating said actuating member in said bore to contact the solid top of the containing means for movement thereof.

6. A holding device having a head and longitudinal extension for holding two members together, said head and longitudinal extension having a bore extending into said longitudinal extension, lubricant containing means in said bore including a lubricant, said lubricant containing means having a top at one end, passages in said longitudinal extension between the bore and exterior thereof for permitting a flow of lubricant therethrough, means for forming holes in said lubricant containing means, means for moving said top of said lubricant containing means to apply a pressure to said lubricant to force it through said passages.

7. A holding device having a head and longitudinal extension for holding two members together, said head and longitudinal extension having a bore extending into said longitudinal extension, a resilient piercable container in said bore, said container containing a lubricant, passages in said longitudinal extension between the bore and exterior thereof for permitting a flow of lubricant therethrough, said container being adapted to be pierced in position through said passages to release its lubricant, means for applying a force on said container to deform it and thereby apply a pressure on the lubricant to force it through said passages.

8. The device as claimed in claim 7 wherein said longitudinal extension has a threaded portion, and the passages extend to the exterior of the extension where it is threaded.

9. The device as claimed in claim 8 wherein some of the threads of the threaded portion are flat on the top thereof, and the passages extend to the flat part of the threads.

10. The device as claimed in claim 9 wherein a thread is formed of a material to form a seal with a cooperating member.

11. An article of manufacture comprising a bolt-type member adapted to be received in a female receptacle comprising at least one relatively thin wall member defining a chamber therewithin, at least one passageway extending between the exterior and the interior of said wall member, a flexible, sealed, lubricant-containing sack adapted to be inserted into said chamber and said sack being shaped so that the sack will abut said wall member at said passageway and so that said sack may be punctured by the projecting of a pointed article through said passageway and into said sack, and means operatively connected to said sack to apply pressure to said sack and thereby regulate the flow of lubricant from said sack and into said passageway.

References Cited

UNITED STATES PATENTS

| | | | |
|---|---|---|---|
| 776,537 | 12/1904 | Nicholson | 308—103 |
| 916,133 | 3/1909 | Fellows | 85—1 |
| 1,159,779 | 11/1915 | Landau et al. | 85—1 |
| 1,162,746 | 12/1915 | Bowen | 85—1 |

HOUSTON S. BELL, JR., *Primary Examiner.*